(12) United States Patent
Kim et al.

(10) Patent No.: US 12,012,879 B2
(45) Date of Patent: Jun. 18, 2024

(54) OIL LEVEL SENSOR COVER AND ENGINE COMPRISING SAME

(71) Applicant: HD HYUNDAI INFRACORE CO., LTD., Incheon (KR)

(72) Inventors: Jongyoung Kim, Seoul (KR); Seokwon Choi, Yongin-si (KR); Juook Park, Incheon (KR)

(73) Assignee: HD HYUNDAI INFRACORE CO., LTD., Incheon (KR)

( * ) Notice: Subject to any disclaimer, the term of this patent is extended or adjusted under 35 U.S.C. 154(b) by 0 days.

(21) Appl. No.: 18/270,414

(22) PCT Filed: Dec. 24, 2021

(86) PCT No.: PCT/KR2021/019856
§ 371 (c)(1),
(2) Date: Jun. 29, 2023

(87) PCT Pub. No.: WO2022/145903
PCT Pub. Date: Jul. 7, 2022

(65) Prior Publication Data
US 2024/0060436 A1 Feb. 22, 2024

(30) Foreign Application Priority Data

Dec. 30, 2020 (KR) .................. 10-2020-0188250

(51) Int. Cl.
*F01M 11/12* (2006.01)
*F16N 29/00* (2006.01)

(52) U.S. Cl.
CPC ............. *F01M 11/12* (2013.01); *F16N 29/00* (2013.01); *F01M 2250/00* (2013.01); *F16N 2250/18* (2013.01)

(58) Field of Classification Search
CPC .... F01M 11/12; F01M 2250/00; F16N 29/00; F16N 2250/18
USPC .......................................... 184/6.4, 1.5, 108
See application file for complete search history.

(56) References Cited

U.S. PATENT DOCUMENTS

| | | | | |
|---|---|---|---|---|
| 4,256,069 A | * | 3/1981 | Masuda | F01M 11/12 123/196 S |
| 4,583,085 A | * | 4/1986 | Beller | G01F 23/22 73/290 R |
| 4,745,893 A | * | 5/1988 | Atherton | F01M 11/12 123/196 S |

(Continued)

*Primary Examiner* — Henry Y Liu
(74) *Attorney, Agent, or Firm* — K&L Gates LLP

(57) ABSTRACT

An oil level sensor cover according to an embodiment of the present disclosure may be mounted below an engine oil pan to protect an oil level sensor that measures an oil level. The oil level sensor cover may be formed with plates of predetermined sizes, including an upper surface and a lower surface opposite to the upper surface, wherein a plurality of seating portions and a plurality of hook are formed on the upper surface. An engine according to another embodiment of the present disclosure comprises the above-described oil level sensor cover according to an embodiment of the present disclosure, an engine oil fan, and an oil level sensor mounted below the engine oil fan to measure the oil level. The oil level sensor cover can be separated from or coupled to the oil level sensor without the use of a separate tool.

10 Claims, 8 Drawing Sheets

(56) References Cited

U.S. PATENT DOCUMENTS

| | | | | |
|---|---|---|---|---|
| 5,046,583 A * | 9/1991 | Sasaki | G01F 23/243 | 184/6.4 |
| 5,057,813 A * | 10/1991 | Sasaki | F01M 11/12 | 73/304 R |
| 5,687,687 A * | 11/1997 | Trueblood | F01M 11/12 | 123/196 S |
| 5,872,509 A * | 2/1999 | Kim | G01F 23/70 | 73/309 |
| 5,900,810 A * | 5/1999 | Park | G01C 9/20 | 33/366.19 |
| 5,907,278 A * | 5/1999 | Park | G01C 9/20 | 33/366.19 |
| 5,960,908 A * | 10/1999 | Kasahara | F01M 11/0004 | 184/106 |
| 6,443,006 B1 * | 9/2002 | Degrave | G01F 23/266 | 73/304 C |
| 7,263,964 B2 * | 9/2007 | Yamane | F01M 11/0004 | 123/196 S |
| 7,387,101 B2 * | 6/2008 | Fujiki | F01M 11/10 | 123/196 S |
| 7,498,932 B1 * | 3/2009 | Steffen | F01M 1/18 | 123/196 R |
| 7,649,446 B2 * | 1/2010 | Miyashita | F01M 11/12 | 701/99 |
| 7,931,004 B2 * | 4/2011 | Koyama | F02B 75/06 | 123/196 R |
| 9,212,619 B2 * | 12/2015 | Chae | F01M 11/12 | |
| 9,982,580 B2 * | 5/2018 | Staley | F01M 11/0408 | |
| 10,436,627 B2 * | 10/2019 | Roux | F01D 17/02 | |
| 2003/0041659 A1 * | 3/2003 | Marszalek | G01N 33/2888 | 73/114.57 |
| 2007/0056549 A1 * | 3/2007 | Fujiki | G01F 23/22 | 123/195 C |
| 2007/0057675 A1 * | 3/2007 | Yamane | F01M 11/0004 | 324/438 |
| 2007/0182251 A1 * | 8/2007 | Miyashita | F01M 11/12 | 307/10.6 |
| 2009/0212932 A1 * | 8/2009 | Cho | F16D 48/066 | 701/67 |
| 2010/0059011 A1 * | 3/2010 | Koyama | F01M 11/12 | 123/196 R |
| 2014/0172267 A1 * | 6/2014 | Chae | F01M 11/12 | 701/101 |
| 2014/0345977 A1 * | 11/2014 | McGowan | F01M 11/0004 | 184/106 |
| 2016/0290191 A1 * | 10/2016 | Staley | F01M 11/12 | |
| 2018/0156654 A1 * | 6/2018 | Roux | G01F 23/72 | |
| 2023/0101529 A1 * | 3/2023 | Soleilhac | F01M 11/12 | 73/304 R |

* cited by examiner

OIL LEVEL SENSOR COVER AND ENGINE COMPRISING SAME

CROSS-REFERENCE TO RELATED APPLICATIONS

This application is the National Stage filing under 35 U.S.C. 371 of International Application No. PCT/KR2021/019856, filed on Dec. 24, 2021, which claims the benefit of earlier filing date of and right of priority to Korean Application No. 10-2020-0188250 filed on Dec. 30, 2020, the contents of which are all hereby incorporated by reference herein in their entirety.

TECHNICAL FIELD

The present disclosure relates to an oil level sensor cover and an engine comprising the same, and more particularly, to an oil level sensor cover capable of fastening the oil level sensor cover to an oil level sensor without using a separate tool, and an engine comprising the same.

BACKGROUND

A certain amount of engine oil needs to be maintained while an engine is running. When the engine oil is insufficient while the engine is running, an oil film cannot be formed on bearings of an engine drive unit or the like, which may cause engine seizure. When the engine oil is excessive, oil consumption and blow by gas may increase due to churning during engine operation. Accordingly, in order to prevent such a phenomenon, an oil level sensor is mounted on an engine oil pan to measure whether the amount of engine oil is kept constant.

The oil level sensor is mounted on the outside of the engine oil pan and is made of a plastic material, so it is easily damaged when an external impact is applied thereto, which may cause malfunction or leakage of engine oil. Accordingly, a separate sensor cover is sometimes used to protect the oil level sensor.

Referring to FIG. 1, a conventional oil level sensor cover 30 is fastened together with the oil level sensor through a bolt 12 and a nut 13 for fastening the oil level sensor. Specifically, a hole is formed in the oil level sensor cover 30, the other end of the bolt 12 passes through the hole, and the nut 13 is fastened to the other end of the through bolt 12, so that the oil level sensor cover 30 is mounted on the engine oil pan 10 together with the oil level sensor. Accordingly, in the conventional case, the end of the bolt 12 and the nut 13 are exposed to the outside.

In the conventional fastening method of the oil level sensor cover 30, the length of the bolt 12 may increase depending on the thickness of the oil level sensor cover 30, and when a load is applied to the oil level sensor cover 30, deformation of the bolt 12 may be caused. In addition, therefore, a sealing face is deformed, and engine oil leakage may occur at the sealing portion, and fastening force may be reduced due to the bolt deformation.

SUMMARY

Accordingly, one of the various objects of the present disclosure is to provide an oil level sensor cover which prevents an oil level sensor from being damaged by an external impact and is easily attachable and detachable, and an engine including the same.

In addition, one of the various objects of the present disclosure is to provide an oil level sensor cover which can be mounted on the oil level sensor without using a separate tool, and an engine including the same.

Moreover, one of the various objects of the present disclosure is to provide an oil level sensor cover in which when an impact is applied to the oil level sensor cover, the impact is not transmitted to the oil level sensor, and an engine including the oil level sensor cover.

However, the objects to be achieved by the present disclosure are not limited to the above objects, and may be expanded in various ways without departing from the idea and scope of the present disclosure.

In order to achieve various objects of the present disclosure, an exemplary embodiment of the present disclosure provides an oil level sensor cover capable of being mounted to an oil level sensor without using a separate tool by inserting a hook into a locking groove of the oil level sensor, and an engine comprising the same.

In addition, in order to achieve various objects of the present disclosure, an exemplary embodiment of the present disclosure provides an oil level sensor cover in which a seating portion is seated on a nut so that when an impact is applied to the oil level sensor cover, the impact is not transmitted to the oil level sensor, and an engine comprising the same.

The oil level sensor cover according to one embodiment of the present disclosure can protect the oil level sensor mounted to the engine oil pan to measures a level of oil. The oil level sensor cover may be formed of a plate having a predetermined size which includes an upper surface and a lower surface opposite to the upper surface, and a plurality of seating portions and a plurality of hooks are formed on the upper surface.

According to one embodiment, the oil level sensor is mounted to the engine oil pan by means of a bolt and a nut, and the seating portion on the upper surface of the oil level sensor cover is seated on the nut.

According to one embodiment, in a state in which the nut is fastened to one end of the bolt, the lower end portion of the nut is disposed below a lower surface of a body part of the oil level sensor.

According to one embodiment, a certain space is formed between the upper surface of the oil level sensor cover and the lower surface of the body part of the oil level sensor.

According to one embodiment, a side wall protruding upward may be formed at an edge of the upper surface of the oil level sensor cover, and the hook may be formed protruding upward from the side wall.

According to one embodiment, the oil level sensor cover is mounted to the oil level sensor by the hook being fitted into a locking groove formed on a side surface of the body of the oil level sensor.

According to one embodiment, separation of the hook from the locking groove of the oil level sensor is restricted in the absence of external force.

According to one embodiment, at least one rib may be formed on the lower surface of the oil level sensor cover.

According to one embodiment, a recess is formed on the upper surface of the oil level sensor cover.

An engine according to another embodiment of the present disclosure includes the oil level sensor cover according to the above-described embodiment of the present disclosure, an engine oil pan, and an oil level sensor mounted to a lower portion of the engine oil pan to measure a level of oil. The oil level sensor cover protects the oil level sensor.

The oil level sensor cover can be attached to and detached from the oil level sensor without a separate tool.

The oil level sensor cover and the engine including the same according to the embodiments of the present disclosure can prevent the oil level sensor from being damaged by an external impact and can be easily attached to and detached from the oil level sensor.

In addition, the oil level sensor cover can be mounted to the oil level sensor without using a separate tool.

Further, even when an impact is applied to the oil level sensor cover, it is possible to protect the oil level sensor by preventing the impact from being transmitted to the oil level sensor.

However, the effects of the present disclosure are not limited to the above effects, and may be expanded in various ways without departing from the idea and scope of the present disclosure.

DETAILED DESCRIPTION

Hereinafter, embodiments of the present disclosure will be described in more detail with reference to the accompanying drawings. Among the components of the present disclosure, with respect to those that can be clearly understood and easily reproduced by those skilled in the art, detailed descriptions thereof will be omitted so as not to obscure the gist of the present disclosure.

Hereinafter, an oil level sensor cover and an engine comprising the same according to one embodiment of the present disclosure will be described.

Figure 1:
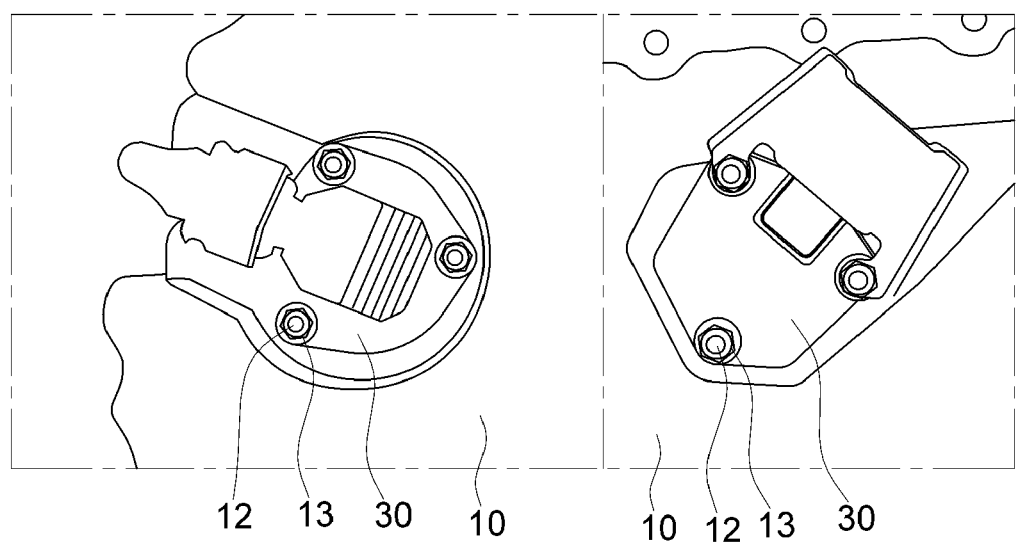
FIG. 1 shows photographs showing a state in which a conventional oil level sensor and a cover are fastened to an engine oil pan.
Figure 2:
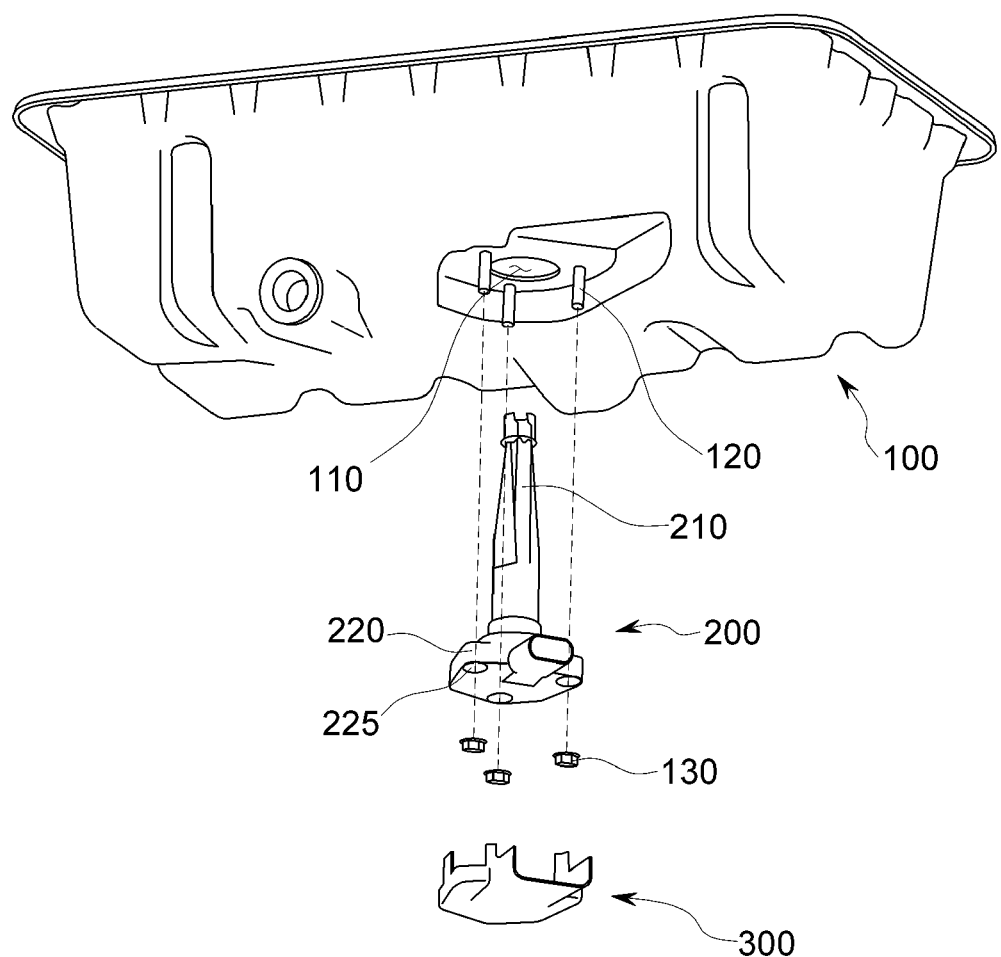
FIG. 2 is an exploded perspective view illustrating a state in which an oil level sensor cover according to one embodiment of the present disclosure is separated from an engine oil pan and an oil level sensor.
Figure 3:
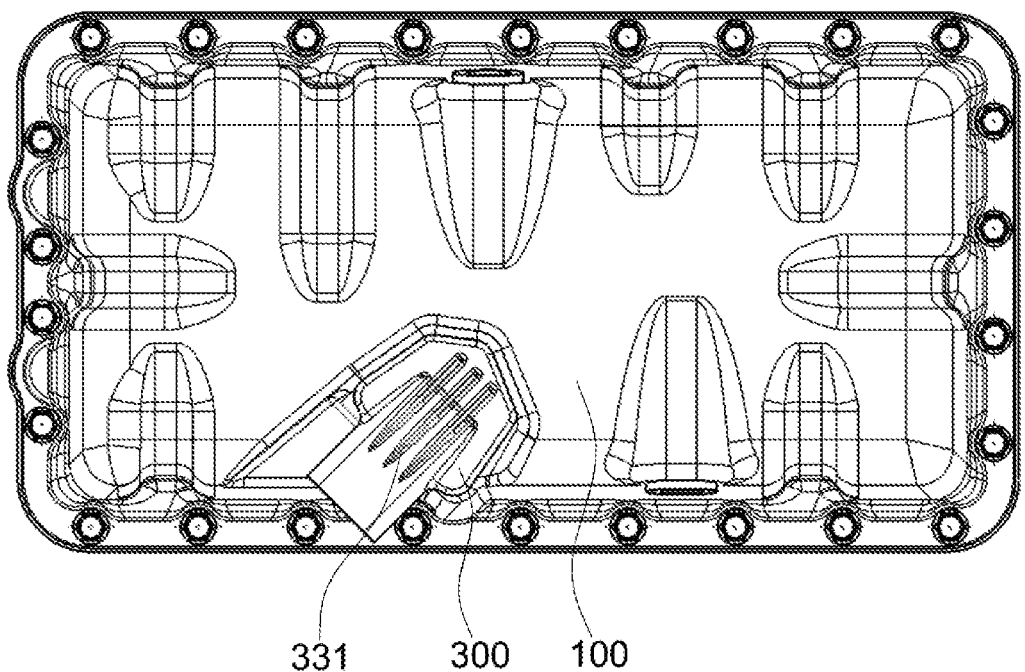
FIG. 3 is a view of the oil level sensor cover viewed from below when the oil level sensor cover according to one embodiment of the present disclosure is fastened to the engine oil pan.

FIG. 1 shows photographs showing a state in which a conventional oil level sensor and a cover are fastened to an engine oil pan, FIG. 2 is an exploded perspective view illustrating a state in which an oil level sensor cover according to one embodiment of the present disclosure is separated from an engine oil pan and an oil level sensor, and FIG. 3 is a view of the oil level sensor cover viewed from below when the oil level sensor cover according to one embodiment of the present disclosure is fastened to the engine oil pan.

Referring to FIGS. 1 to 3, an oil level sensor 200 may be fastened to a lower portion of an engine oil pan 100 to measure a level of oil stored in the engine oil pan 100, and an oil level sensor cover 300 may be fastened to the oil level sensor 200 to protect the oil level sensor 200. Hereinafter, the engine oil pan 100, the oil level sensor 200, and the oil level sensor cover 300 will be described in detail.

<Engine Oil Pan 100>

A hole 110 into which the oil level sensor 200 can be inserted is formed in a lower surface of the engine oil pan 100, and a plurality of bolts 120 (for example, welding bolts) for fastening the oil level sensor 200 may be disposed around the hole 110.

The bolt 120 has a certain length, one end of the bolt 120 is connected to the lower surface of the engine oil pan 100, and the other end of the bolt 120 may be disposed to be directed downward from the lower surface of the engine oil pan 100. In this case, one end of the bolt 120 may be connected to the lower surface of the engine oil pan 100 by welding, or may be integrally formed with the engine oil pan 100 so as to protrude from the lower surface of the engine oil pan 100.

When the oil level sensor 200 is mounted to the engine oil pan 100, the other end of the bolt 120 passes through a through-hole 225 formed in the oil level sensor 200, and a nut 130 may be fastened to the other end of the bolt 120. The oil level sensor 200 may be fixed to the engine oil pan 100 by fastening the nut 130 to the other end of the bolt 120.

<Oil Level Sensor 200>

Figure 4A:
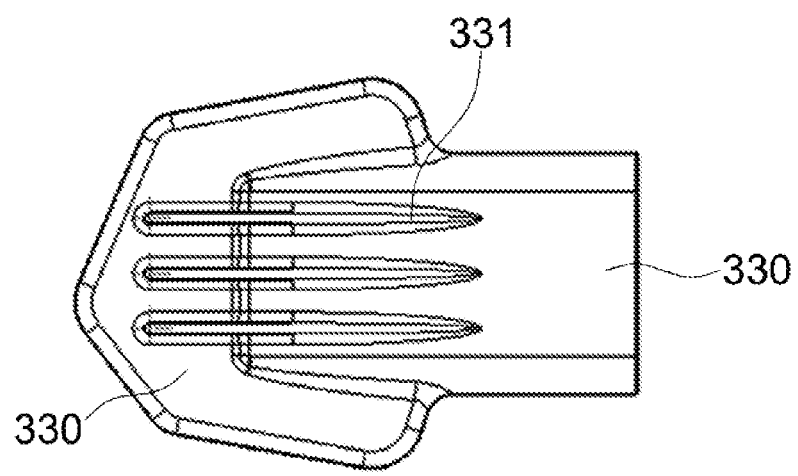
FIGS. 4A to 4F are views showing the oil level sensor cover according to one embodiment of the present disclosure.
Figure 4B:
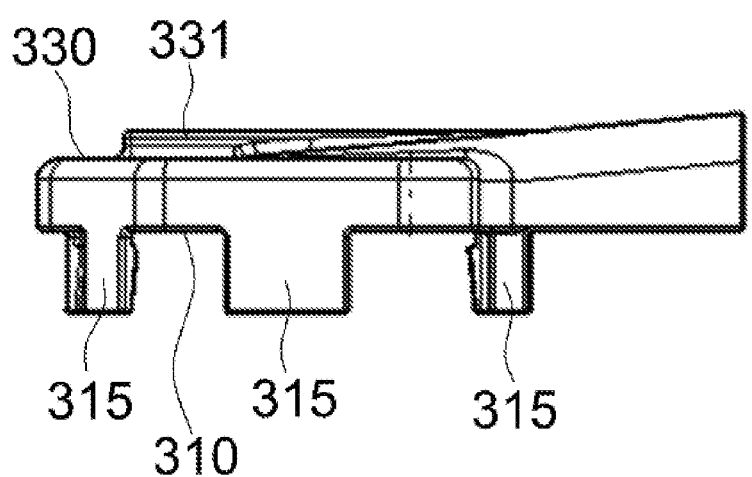
Figure 4C:
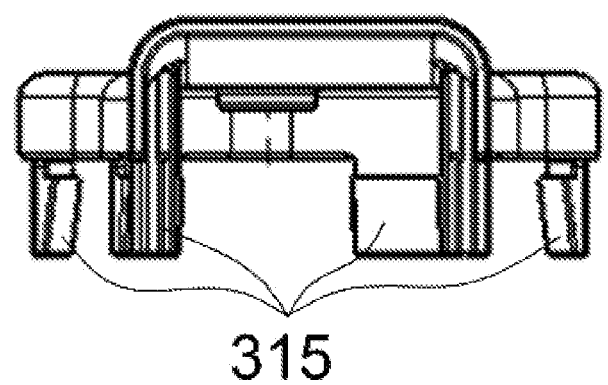
Figure 4D:
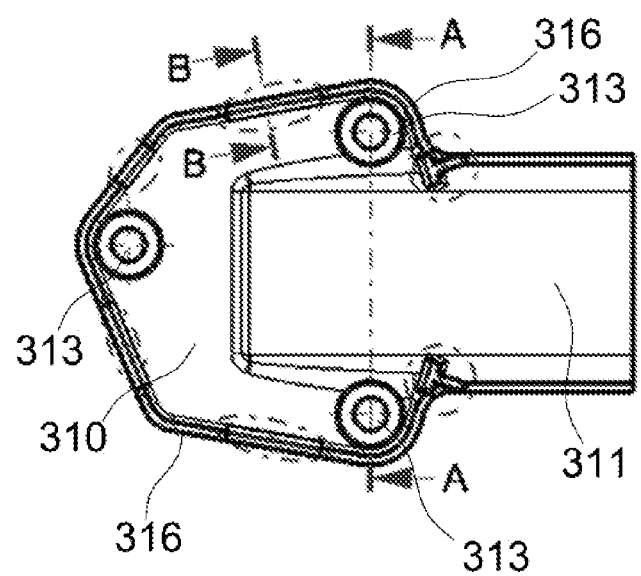
Figure 4E:
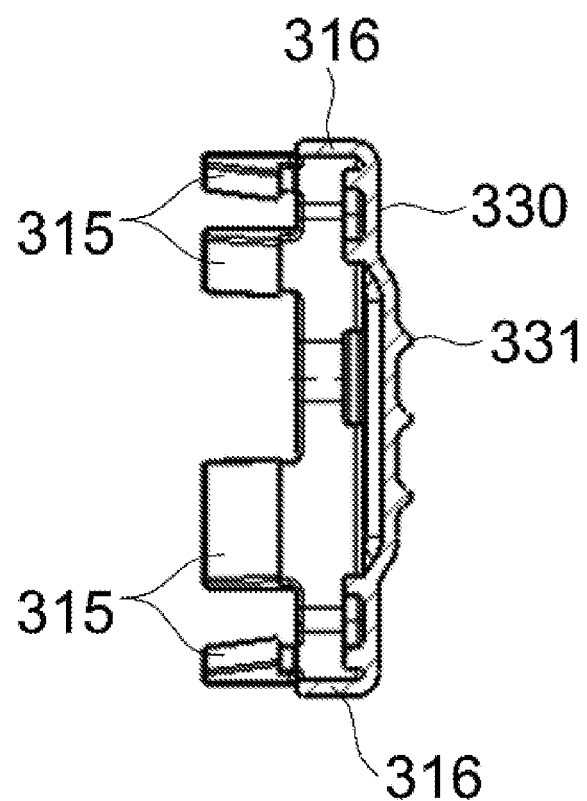
Figure 4F:
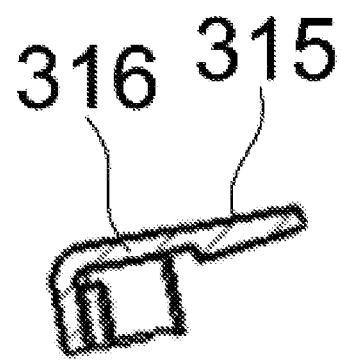
Figure 5:
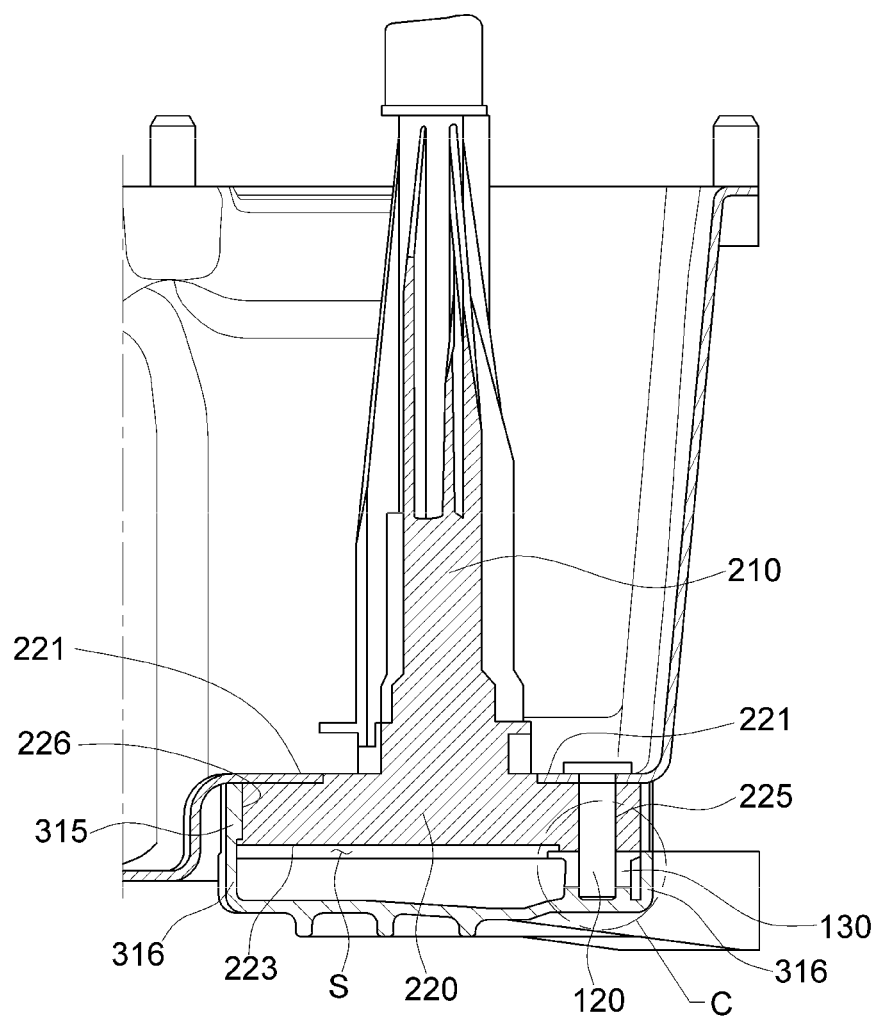
FIG. 5 is a cross-sectional view of the oil level sensor cover according to one embodiment of the present disclosure and the oil level sensor in a state in which they are coupled to the engine oil pan.
Figure 6:
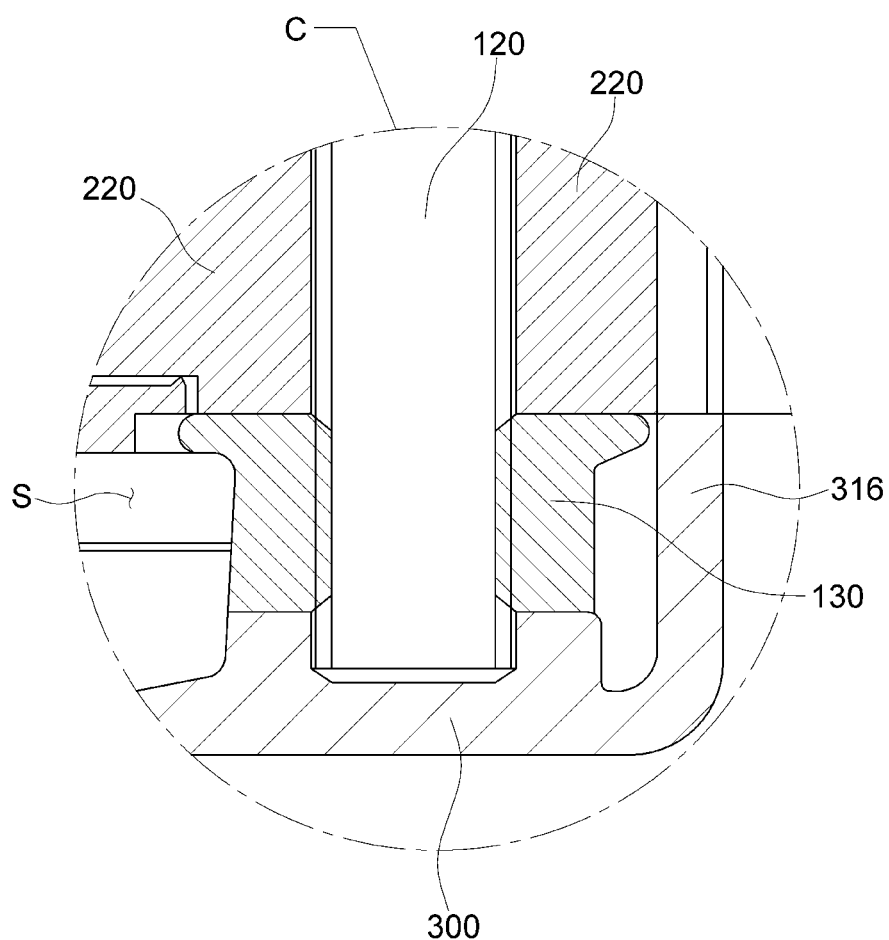
FIG. 6 is a partial enlarged view of part C in FIG. 5.

FIGS. 4A to 4F are views showing the oil level sensor cover according to one embodiment of the present disclosure, FIG. 5 is a cross-sectional view of the oil level sensor cover according to one embodiment of the present disclosure and the oil level sensor in a state in which they are coupled to the engine oil pan, and FIG. 6 is a partial enlarged view of part C in FIG. 5. FIG. 4A is a view of the oil level sensor cover when viewed from below, FIG. 4B is a front view in a state where a lower surface of the oil level sensor cover faces upward, FIG. 4C is a side view in a state where the lower surface of the oil level sensor cover faces upward, FIG. 4D is a view of the oil level sensor cover when viewed from above, FIG. 4E is a cross-sectional view taken along line A-A in FIG. 4D, and FIG. 4F is a cross-sectional view taken along line B-B in FIG. 4D.

Referring to FIGS. 2 to 6, the oil level sensor 200 can measure a level of oil stored in the engine oil pan 100.

Since the oil level sensor 200 shown in FIGS. 2 and 5 is a sensor generally used in automobiles, and the like, a description of the operating principle of the oil level sensor 200 will be omitted, and hereinafter, in describing the oil level sensor cover 300 according to one embodiment of the present disclosure, only necessary parts will be described.

The oil level sensor 200 may include a sensing part 210 and a body part 220. When the oil level sensor 200 is mounted to the engine oil pan 100, the sensing part 210 is inserted into the hole 110 formed on the lower surface of the engine oil pan 100 to be placed inside the engine oil pan 100, and the body part 220 is connected to one end of the sensing part 210 and is disposed outside the engine oil pan 100.

A connector connection part may be formed on a side surface of the body part 220, and a connector may be disposed on the connector connection part to be electrically connected to an electronic control unit of a vehicle.

In addition, a plurality of locking grooves 226 may be formed on a side surface of the body part 220. The locking groove 226 may be formed by forming a stepped portion on the side surface of the body part 220 or by forming a recess on the side surface of the body part 220.

A hook 315 of the oil level sensor cover 300 may be disposed in the locking groove 226. The oil level sensor cover 300 may be fixed to the oil level sensor 200 by inserting the hook 315 of the oil level sensor cover 300 into the locking groove 226 of the oil level sensor 200.

In addition, a plurality of through-holes 225 may be formed in the body part 220. The through-hole 225 is a hole passing through an upper surface 221 and a lower surface 223 of the body part 220. One end of the sensing part 210 may be disposed at a central portion of the upper surface 221 of the body part 220, and the plurality of through-holes 225 may be formed in an outer peripheral portion of the upper surface 221 of the body part 220.

The number of the through-holes 225 formed in the body part 220 may be the same as the number of the bolts 120 formed in the engine oil pan 100.

The oil level sensor 200 is mounted to the engine oil pan 100 as follows. The other end of the bolt 120 formed on the engine oil pan 100 passes through the through-hole 225 formed in the body part 220 of the oil level sensor 200, and the nut 130 is fastened to the other end of the bolt 120 passing through the through-hole 225, so that the oil level sensor 200 can be mounted (fixed) to the engine oil pan 100.

As described above, since the nut 130 is fastened to the other end of the bolt 120 passing through the through-hole 225, the nut 130 is disposed below the body part 220 of the oil level sensor 200, and the oil level sensor cover 300 is disposed below the nut 130. Thus, the nut 130 is not exposed to the outside.

In a state where the nut 130 is fastened to the other end of the bolt 120, a lower end portion of the nut 130 is disposed below the lower surface 223 of the body part 220 of the oil level sensor 200. Accordingly, a certain space S may be formed between an upper surface 310 of the oil level sensor cover 300 and the lower surface 223 of the body part 220 of the oil level sensor 200.

<Oil Level Sensor Cover 300>

The oil level sensor cover 300 serves to protect the oil level sensor 200.

Referring back to FIG. 1, a conventional oil level sensor cover 30 is fastened together with a bolt 12 and a nut 13 for fastening the oil level sensor. Specifically, a hole is formed in the oil level sensor cover 30, the other end of the bolt 12 passes through the hole, and the nut 13 is fastened to the other end of the bolt 12 passing through the hole, so that the oil level sensor cover 30 is mounted (fixed) to an engine oil pan 10 together with the oil level sensor. Accordingly, in the conventional case, the nut 13 is exposed to the outside.

The oil level sensor cover 300 according to the embodiment of the present disclosure accommodates the body part 220 of the oil level sensor 200 and the nut 130 disposed below the body part 220, so that the nut 130 is not exposed to the outside. Specifically, the other end of the bolt 120 formed in the engine oil pan 100 passes through the through-hole 225 formed in the body part 220 of the oil level sensor 200, and the nut 130 is fastened to the other end of the through-bolt 120, so that the oil level sensor 200 is mounted to the engine oil pan 100. In addition, since the oil level sensor cover 300 is fastened to the body part 220 of the oil level sensor 200 while surrounding the body part 220 and the nut 130, the nut 130 not exposed to the outside.

The oil level sensor cover 300 according to the embodiment of the present disclosure will be described in detail as follows.

The oil level sensor cover 300 according to the embodiment of the present disclosure may be formed of a plate having a predetermined size which includes the upper surface 310 and a lower surface 330 opposite to the upper surface 310.

The shape of the plate constituting the oil level sensor cover 300 may include a shape corresponding to the shape of the lower surface 223 of the body part 220 of the oil level sensor 200. In this case, the meaning of including the corresponding shape means that, for example, when the shape of the lower surface 223 of the body part 220 is a triangle, the shape of the plate of the oil level sensor cover 300 may also include a triangle matched with the shape of the loser surface 223 of the body part 220.

The plate constituting the oil level sensor cover 300 may have a size to accommodate the body part 220 of the oil level sensor 200.

The upper surface 310 of the oil level sensor cover 300 may be formed as a surface including a curve or a stepped portion. Accordingly, the upper surface 310 may include a recess 311 of a predetermined size formed by the curve or the stepped portion. A connector electrically connected to the oil level sensor 200 may be disposed in the recess 311 of the predetermined size. The recess 311 formed on the upper surface 310 may form (or include) a space so that the connector can be easily coupled and separated. In addition, after the oil level sensor cover 300 is mounted on the oil level sensor 200, when condensate is generated due to a temperature difference inside the oil level sensor cover 300 or rainwater flows in the oil level sensor cover 300, the recess 311 forms a slope (is formed to be inclined) to allow the condensate or rainwater to be easily discharged, so that damage to the oil level sensor 200 can be prevented.

In addition, a plurality of seating portions 313 may be formed on the upper surface 310 of the oil level sensor cover 300.

The seating portions 313 may be formed in an outer portion of the upper surface 310 of the oil level sensor cover 300. Specifically, when the oil level sensor 200 is mounted to the engine oil pan 100 by the bolts 120 and the nuts 130 and the oil level sensor cover 300 is mounted on the oil level sensor 200, the seating portions 313 may be formed at corresponding positions below the through-holes 225 formed in the body part 220 of the oil level sensor 200 and the nuts 130 in the upper surface 310 of the oil level sensor cover 300.

The seating portion 313 may be seated on the other end of the bolt 120 formed on the engine oil pan 100 and/or the nut 130.

In a state where the nut 130 is fastened to the other end of the bolt 120, the lower end portion of the nut 130 is disposed below the lower surface 223 of the body part 220 of the oil level sensor 200. Accordingly, a certain space S is formed between the upper surface 310 of the oil level sensor cover 300 and the lower surface 223 of the body part 220 of the oil level sensor 200. In addition, since the seating portion 313 is seated on the nut 130, the upper surface 310 of the oil level sensor cover 300 contacts only the other end of the bolt 120 and the nut 130, or the nut 130, so that when an impact is applied to the oil level sensor cover 300, the impact is not transmitted to the oil level sensor 200.

In addition, a plurality of hooks 315 may be formed on the upper surface 310 of the oil level sensor cover 300. The oil level sensor cover 300 according to the embodiment of the present disclosure may be coupled to the oil level sensor 200 by the hooks 315.

The hooks 315 may protrude upward from an edge of the upper surface 310 of the oil level sensor cover 300. According to the embodiment of the present disclosure, a sidewall 316 protruding upward may be formed at the edge of the upper surface 310 of the oil level sensor cover 300, and the hooks 315 may protrude upward from the sidewall 316.

The plurality of hooks 315 may be spaced apart from each other by a predetermined distance. The distance between one hook 315 and another hook 315 adjacent thereto may not be constant.

The shapes and sizes of the plurality of hooks 315 may be same or different.

The hook 315 of the oil level sensor cover 300 is inserted into the locking groove 226 formed on the side surface of the body part 220 of the oil level sensor 200, which enables the oil level sensor cover 300 to be mounted (fixed) to the oil level sensor 200. This allows a user to mount the oil level sensor cover 300 to the oil level sensor 200 without using a separate tool.

The hook 315 is elastically deformed outward while moving along the side surface of the body part 220 of the oil level sensor 200, and then restored to its original position when the hook 315 is inserted into the locking groove 226 formed on the side surface of the body part 220 of the oil level sensor 200. Accordingly, the hook 315 of the oil level sensor cover 300 may be engaged with the locking groove 226 of the body part 220 of the oil level sensor 200. Due to such engagement, the oil level sensor cover 300 is not easily separated from the oil level sensor 200. The hooks 315 may prevent the oil level sensor cover 300 from being separated from the oil level sensor 200 in the absence of external force.

In addition, the oil level sensor cover 300 is coupled to the oil level sensor 200 in a state in which the oil level sensor 200 is mounted (fixed) to the engine oil pan 100 by the bolts 120 and the nuts 130, so that since a separate external force is not applied to the oil level sensor 200 in the process of coupling the oil level sensor cover 300 to the oil level sensor 200, the risk of damaging the oil level sensor 200 during the assembly process can be minimized. This enables a user to easily couple and decouple the oil level sensor 200 and the cover 300 without damage or break.

At least one rib 331 may be formed on the lower surface 330 of the oil level sensor cover 300. The rib 331 serves to reinforce the thin and flat plate constituting the oil level sensor cover 300 so as not to be damaged.

The rib 331 has a predetermined length and may protrude from the lower surface 330 of the oil level sensor cover 300 in a direction perpendicular thereto. The rib 331 is formed to have a length that cover the lower surface 223 of the body part 220 of the oil level sensor 200 or longer and can serve to absorb a load which may be applied to the oil level sensor 200 and the engine oil pan 100, and support the engine oil pan 100 when it is placed on the ground.

An engine (not shown) according to another embodiment of the present disclosure includes an oil level sensor cover 300, an engine oil pan 100, and an oil level sensor 200 installed to a lower portion of the engine oil pan 100 to measure a level of oil. The oil level sensor cover 300 according to the above-described embodiment of the present disclosure can protect the oil level sensor 200. The oil level sensor cover 300 can be coupled to and separated from the oil level sensor 200 without a separate tool.

The features, structures, effects, etc. described in the above embodiments are included in at least one embodiment of the present disclosure, and are not necessarily limited to only one embodiment. Furthermore, the features, structures, effects, etc. exemplified in each embodiment can be combined or modified by a person having ordinary knowledge in the art to which the embodiments pertain. Accordingly, contents related to these combinations and modifications should be construed as being included in the scope of the present disclosure.

In addition, although the embodiments have been described above, these are only examples and do not limit the present disclosure, and a person having ordinary knowledge in the art to which the present disclosure pertains will know that various modifications and applications not exemplified above are possible within a range that does not deviate from the essential characteristics of the present embodiment. That is, each component specifically shown in the embodiments can be modified to be implemented. In addition, the differences related to these modifications and applications should be construed as being included in the scope of the present disclosure as defined in the appended claims.

DESCRIPTION OF REFERENCE NUMERALS 10, 100: engine oil pan
12, 120: bolt
13, 130: nut
200: oil level sensor
210: sensing part of oil level sensor
220: body part of oil level sensor
225: through-hole
300: oil level sensor cover
310: upper surface of oil level sensor cover
311: recess
313: seating portion
315: hook
316: side wall
330: lower surface of oil level sensor cover
331: rib

What is claimed is:

1. An oil level sensor cover for protecting an oil level sensor which is mounted to a lower portion of an engine oil pan to measure a level of oil, wherein:
the oil level sensor cover is formed of a plate having a predetermined size which includes an upper surface of the oil level sensor cover and a lower surface of the oil level sensor cover, opposite to the upper surface of the oil level sensor cover, and a plurality of seating portions and a plurality of hooks are formed on the upper surface of the oil level sensor cover.

2. The oil level sensor cover of claim 1, wherein the oil level sensor is mounted to the engine oil pan by means of a bolt and a nut, and
the seating portion on the upper surface of the oil level sensor cover is seated on the nut.

3. The oil level sensor cover of claim 2, wherein in a state in which the nut is fastened to the other end of the bolt, a lower end portion of the nut is disposed below a lower surface of a body part of the oil level sensor.

4. The oil level sensor cover of claim 3, wherein a certain space is formed between the upper surface of the oil level sensor cover and the lower surface of the body part of the oil level sensor.

5. The oil level sensor cover of claim 1, wherein a sidewall protruding upward is formed at an edge of the upper surface of the oil level sensor cover, and the hooks are formed to protrude upward from the sidewall.

6. The oil level sensor cover of claim 5, wherein the oil level sensor cover is mounted to the oil level sensor by the hook being fitted into a locking groove formed on a side surface of the body of the oil level sensor.

7. The oil level sensor cover of claim 6, wherein separation of the hook from the locking groove is restricted in the absence of external force.

8. The oil level sensor cover of claim 1, wherein at least one rib is formed on the lower surface.

9. The oil level sensor cover of claim 1, wherein a recess is formed on the upper surface.

10. An engine comprising:
the oil level sensor cover according to claim 1;
an engine oil pan; and
an oil level sensor mounted to a lower portion of the engine oil pan to measure a level of oil,
wherein the oil level sensor cover is attachable to and detachable from the oil level sensor without a separate tool, and
the oil level sensor cover protects the oil level sensor.

\* \* \* \* \*